(12) United States Patent
Huerta et al.

(10) Patent No.: US 9,121,311 B2
(45) Date of Patent: Sep. 1, 2015

(54) CONTROL VALVE

(71) Applicant: GM GLOBAL TECHNOLOGY OPERATIONS LLC, Detroit, MI (US)

(72) Inventors: Rolando Huerta, Wyoming, MI (US); William P. Vukovich, Wyoming, MI (US); Jorge A. Campuzano, Ada, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 62 days.

(21) Appl. No.: 14/153,445

(22) Filed: Jan. 13, 2014

(65) Prior Publication Data

US 2015/0114328 A1    Apr. 30, 2015

Related U.S. Application Data

(60) Provisional application No. 61/895,690, filed on Oct. 25, 2013.

(51) Int. Cl.

| F01L 1/34 | (2006.01) |
|---|---|
| F01L 1/344 | (2006.01) |
| F01L 5/04 | (2006.01) |
| F01L 9/04 | (2006.01) |
| F16K 11/10 | (2006.01) |

(52) U.S. Cl.
CPC . F01L 1/344 (2013.01); F01L 5/04 (2013.01); F01L 9/04 (2013.01); F16K 11/10 (2013.01); F01L 2009/0478 (2013.01)

(58) Field of Classification Search
CPC ..... F01L 9/04; F01L 2009/0478; F16K 11/10
See application file for complete search history.

(56) References Cited

U.S. PATENT DOCUMENTS

| 5,657,725 A * | 8/1997 | Butterfield et al. ........ 123/90.17 |
|---|---|---|
| 6,840,202 B2 | 1/2005 | Simpson |

* cited by examiner

*Primary Examiner* — Zelalem Eshete
(74) *Attorney, Agent, or Firm* — Quinn Law Group, PLLC

(57) ABSTRACT

A control valve includes a valve body, which defines first, second, and third valve passageways. The valve body also defines a supply passageway. The control valve includes a first spool movable relative to the valve body between first and second positions. The control valve includes a second spool movable relative to the valve body between open and closed positions. The supply passageway is in fluid communication with the first valve passageway when the first spool is in the first position. The supply passageway is in fluid communication with the second valve passageway when the first spool is in the second position. The supply passageway is in fluid communication with the third valve passageway when the second spool is in the open position. The second spool precludes fluid flow between the supply passageway and the third valve passageway when the second spool is in the closed position.

20 Claims, 7 Drawing Sheets

CONTROL VALVE

CROSS-REFERENCE TO RELATED APPLICATIONS

This application claims the benefit of U.S. Provisional Application 61/895,690, filed Oct. 25, 2013, which is hereby incorporated by reference in its entirety.

TECHNICAL FIELD

The present disclosure relates to a control valve for controlling a variable cam phaser.

BACKGROUND

Control valves can be used to control many types of devices. For example, in a vehicle, a control valve can be used to control a variable cam phaser. A variable cam phaser is operatively coupled to a camshaft. The camshaft can actuate the intake and exhaust valves of an engine. During operation of the engine, the control valve can control the variable cam phaser. The variable cam phaser can in turn control the rotation of the camshaft, relative to the crankshaft, to adjust the timing of intake and/or exhaust valve events. Adjusting valve timing based on engine operating conditions may enhance engine performance and minimize engine emissions.

SUMMARY

It is useful to control the operation of a variable cam phaser using a control valve in order to adjust the timing of intake or exhaust valve events in an engine. Variable cam phasers include a stator and a rotor disposed within the stator. The rotor can rotate relative to the stator and is operatively coupled to a camshaft. It is useful to control the movement of the rotor relative to the stator in order to control the movement of the camshaft. The rotor can also be locked to the stator in order to maintain the rotor stationary relative to the stator when cam phasing is not enabled. As a non-limiting example, a lock pin can be actuated (or otherwise moved) to lock the rotor to the stator. It is therefore useful to develop a control valve capable of controlling the movement of the lock pin and independently controlling the rotation of the rotor relative to the stator.

In an embodiment, the control valve includes a valve body extending along a longitudinal axis. The valve body defines a first valve passageway, a second valve passageway, a third valve passageway, and a supply passageway. The control valve includes a first spool movably disposed in the valve body. The first spool is movable relative to the valve body along the longitudinal axis between a first position and a second position. The control valve further includes a second spool movably disposed in the valve body. The second spool is movable relative to the valve body along the longitudinal axis between an open position and a closed position. The supply passageway is in fluid communication with the first valve passageway when the first spool is in the first position. The supply passageway is in fluid communication with the second valve passageway when the first spool is in the second position. The supply passageway is in fluid communication with the third valve passageway when the second spool is in the open position. The second spool precludes fluid flow between the supply passageway and the third valve passageway when the second spool is in the closed position. The position of the first spool is not limited to the first and second positions. Rather, the first spool is continuously moving and could be anywhere in between first and second position as commanded by an engine control unit.

The present disclosure relates to a camshaft system. The camshaft system includes a camshaft extending along a longitudinal axis. The camshaft system further includes a variable cam phaser operatively coupled to the camshaft. The variable cam phaser includes a stator including at least one lobe. Further, the variable cam phaser includes a rotor operatively coupled to the camshaft. The rotor is disposed radially inward with respect to the stator and includes first and second vanes. The lobe is disposed between the first and second vanes such that the rotor and the stator collectively define a first chamber between the lobe and the first vane. Also, the rotor and stator collectively define a second chamber between the lobe and the second vane. The rotor defines a hole in the first vane. The variable cam phaser further includes a lock pin movably disposed in the hole. The camshaft system further includes a control valve operatively coupled to the variable cam phaser. The control valve includes a valve body operatively coupling the camshaft to the rotor. The valve body defines a supply passageway. The control valve further includes a first spool movably disposed in the valve body. The first spool is movable relative to the valve body between a first position and a second position. The control valve further includes a second spool movably disposed in the valve body. The second spool is movable relative to the valve body between an open position and a closed position. The supply passageway is in fluid communication with the first chamber when the first spool is in the first position. The supply passageway is in fluid communication with the second chamber when the first spool is in the second position. The supply passageway is in fluid communication with the hole when the second spool is in the open position. The second spool precludes fluid flow between the supply passageway and the hole when the second spool is in the closed position.

The above features and advantages and other features and advantages of the present invention are readily apparent from the following detailed description of the best modes for carrying out the invention when taken in connection with the accompanying drawings.

DETAILED DESCRIPTION

Figure 1:
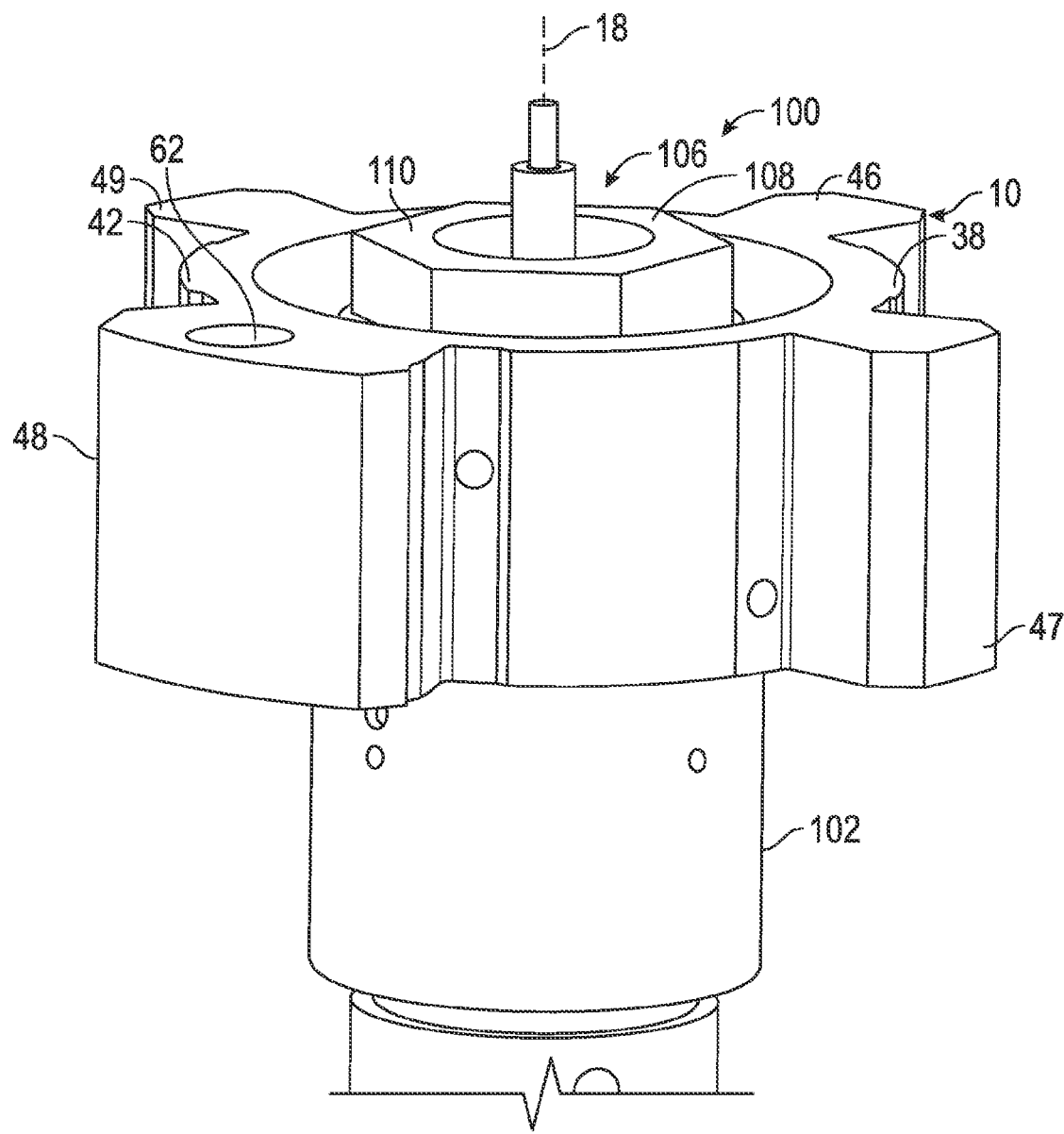
FIG. 1 is schematic, perspective view of a camshaft system including a camshaft, a rotor of a variable cam phaser, and a control valve coupling the rotor to the camshaft.
Figure 2:
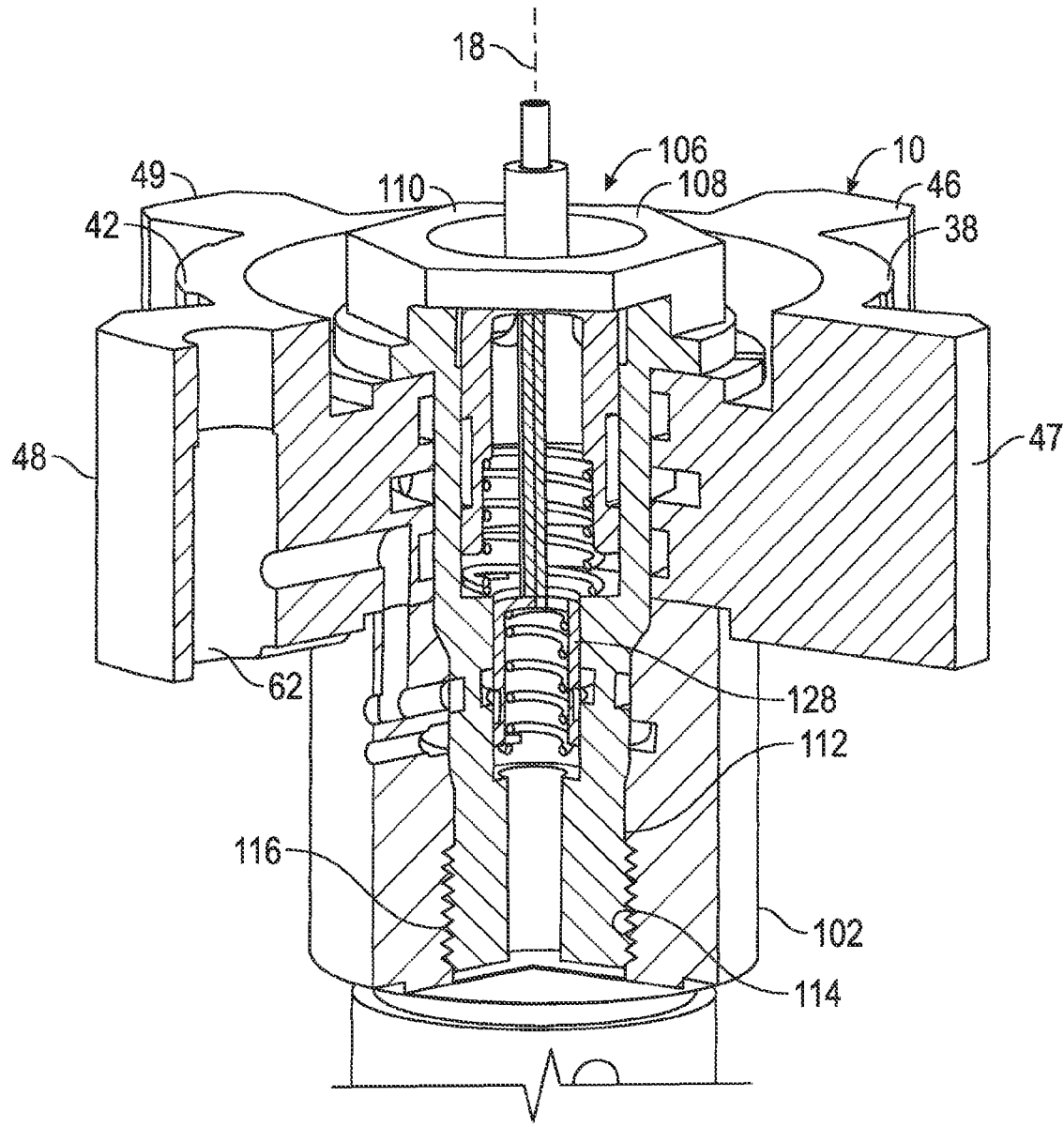
FIG. 2 is a schematic, perspective, sectional view of the camshaft system of FIG. 1 showing a first spool and a second spool disposed inside of a valve body.
Figure 3:
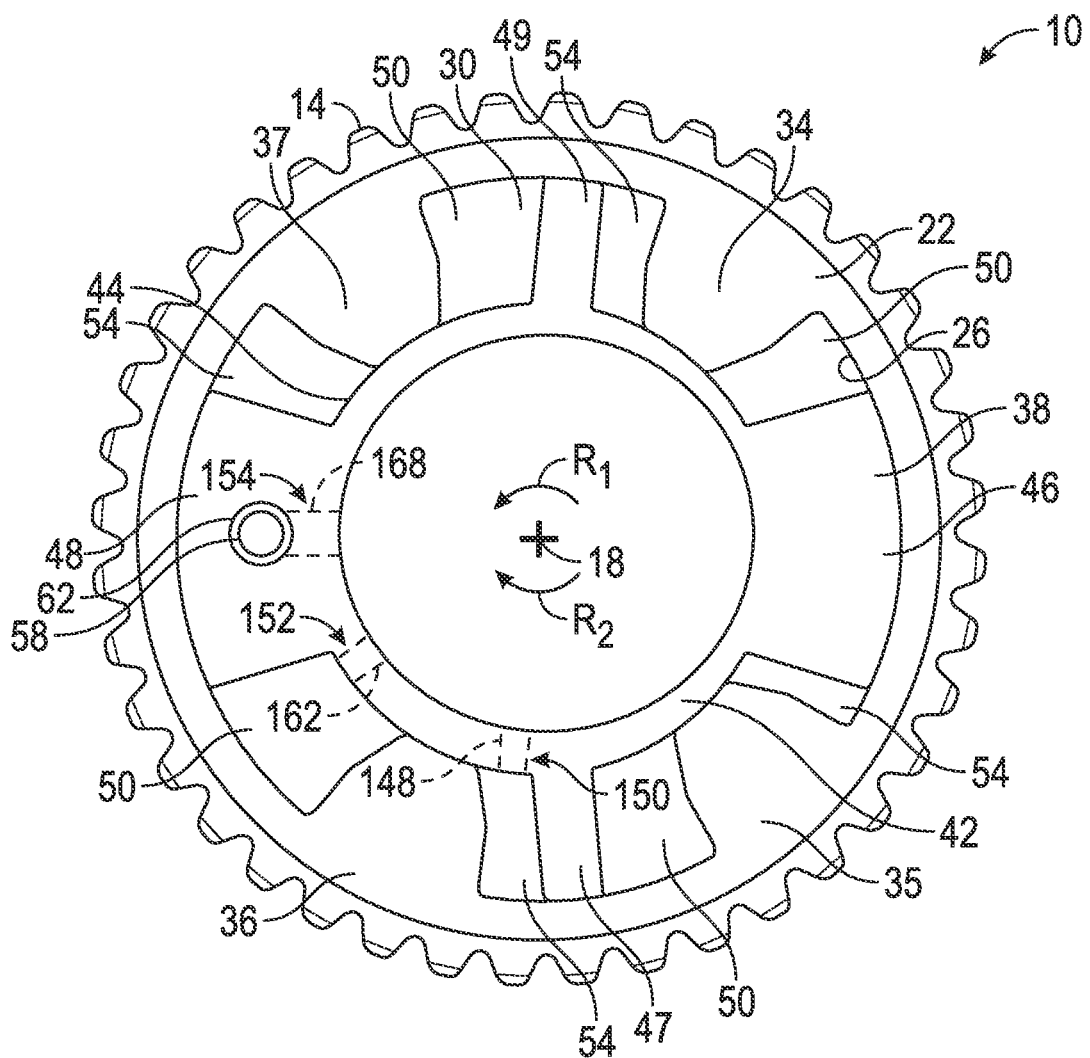
FIG. 3 is a schematic, top view of a variable cam phaser.
Figure 4:
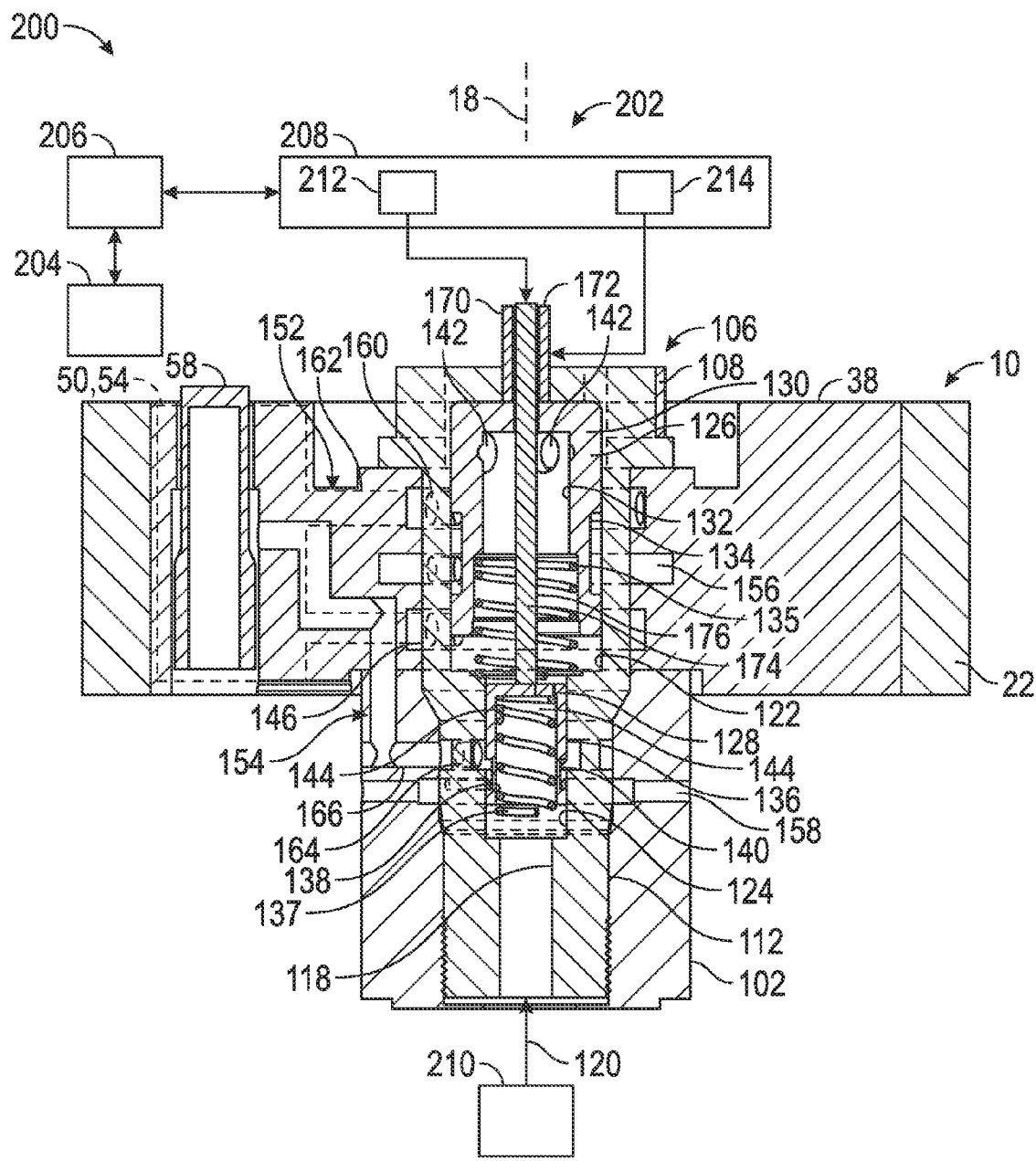
FIG. 4 is a schematic, sectional view of an engine assembly including the camshaft system shown in FIG. 1, a fluid source in fluid communication with the camshaft system, an actuation assembly operatively coupled to the camshaft system, and an engine control module in communication with the actuation assembly.

Referring now to the drawings, wherein like numerals indicate corresponding parts throughout the several views, FIGS. 1 and 2 schematically illustrate a camshaft system 100 for adjusting the timing of the intake and exhaust events in an internal combustion engine 204 (FIG. 4). The camshaft system 100 includes a camshaft 102 and variable cam phaser 10 operatively coupled to the camshaft 102. Additionally, the camshaft system 100 includes a control valve 106 operatively coupling the variable cam phaser 10 and camshaft 102. Although the variable cam phaser 10 includes a stator 22 (FIG. 3) and a rotor 38, the FIGS. 1 and 2 only show the rotor 38. The rotor 38 can rotate about a longitudinal axis 18. The camshaft 102 is operatively coupled to the rotor 38 and can rotate about the longitudinal axis 18. The control valve 106 includes a valve body or housing 108 extending along the longitudinal axis 18. The valve body 108 serves as a coupler and couples the rotor 38 to the camshaft 102. As a non-limiting example, the valve body 108 may be configured as a bolt having a head 110 and a shank 112 coupled to the head 110. The head 110 is disposed over the rotor 38 and the shank 112 is disposed in the rotor 38 and the camshaft 102. The shank 112 includes external threads 114, and the camshaft 102 includes inner threads 116 configured to mate with the external threads 114 in order to couple the valve body 108 to the camshaft 102.

With reference to FIG. 3, the variable cam phaser 10 includes a sprocket 14 for engaging a belt or chain (not shown). The sprocket 14 is operatively connected to an engine crankshaft (not shown). Accordingly, the sprocket 14 is drivable by the engine crankshaft via the chain for rotation about the longitudinal axis 18. As discussed above, the variable cam phaser 10 also includes the stator 22. The stator 22 is mounted with respect to the sprocket 14 for unitary rotation therewith about the longitudinal axis 18. The stator 22 has an inner surface 26 that defines a chamber 30. The inner surface 26 is generally cylindrical, but includes a plurality of lobes 34, 35, 36, 37 that extend radially inward (toward the longitudinal axis 18).

As discussed above, the variable cam phaser 10 also includes the rotor 38. The rotor 38 is disposed within the chamber 30 and includes a hub portion 42 having a generally cylindrical outer surface 44. A plurality of vanes 46, 47, 48, 49 extend outward from the hub portion 42. Although the vanes 46, 47, 48, 49 shown in FIG. 3 have different shapes than the vanes 46, 47, 48, 49 shown in FIGS. 1 and 2, it is envisioned that the vanes 46, 47, 48, 49 may have the shapes shown in FIGS. 1 and 2 or the shapes shown in FIG. 3. Irrespective of their shape, each vane 46, 47, 48, 49 contacts a respective cylindrical portion of the inner surface 26 of the stator 22. Each of the vanes 46, 47, 48, 49 is disposed between two of the lobes 34, 35, 36, 37. Each lobe 34, 35, 36, 37 contacts a cylindrical portion of the outer surface 44 of the rotor 38. The lobes 34, 35, 36, 37 and the vanes 46, 47, 48, 49 define chambers 50, 54 therebetween. The chambers 50, 54 are selectively pressurized by hydraulic fluid to cause the rotor 38 to rotate about the longitudinal axis 18 with respect to the stator 22 and thereby change the valve timing in the engine 204 (FIG. 4). The chamber 54 may be referred to as the first chamber, and the chamber 50 may be referred to as the second chamber. The vane 47 may be referred to as the first vane, and the vane 48 may be referred to as the second vane.

More specifically, the rotor 38 is mounted with respect to the camshaft 102 (FIG. 1). Accordingly, rotating the rotor 38 relative to the stator 22 in one direction (i.e., the first rotational direction R1 or second rotational direction R2) will advance valve timing, whereas rotating the rotor 38 relative to the stator 22 in the opposite direction will retard timing. The movement of the rotor 38 relative to the stator 22 is limited by interference between the lobes 34, 35, 36, 37 and the vanes 46, 47, 48, 49. For example, maximum valve timing advance may occur when vane 49 contacts lobe 34, and maximum valve timing retard may occur when vane 49 contacts lobe 37.

The rotor 38 can be locked in a "mid park" position relative to the stator 22 as shown in FIG. 3. When the rotor 38 is in the "mid park" position, the vanes 46, 47, 48, 49 are not in contact with any of the lobes 34, 35, 36, 37. To lock the rotor 38 in the "mid park" position, the variable cam phaser 10 includes a rotor lock pin 58 that is at least partially disposed within a cylindrical hole 62 formed in vane 48 (or any other vane). The hole 62 and the pin 58 are oriented and dimensioned such that movement of the pin 58 relative to the rotor 38 is substantially limited to linear translation parallel to the longitudinal axis 18. The pin 58 is movable relative to the rotor 38 between an extended position and a retracted position. In the extended position, the pin 58 protrudes from the hole 62 and may engage a cover (not shown) attached to the stator 22. When the rotor 38 is in the mid park position and the pin 58 is in the extended position, a portion of the pin 58 engages the cover (not shown), and another portion of the pin 58 is in the hole 62, thereby locking the rotor 38 relative to the stator 22. In the retracted position, the pin 58 does not protrude substantially from the hole 62. The pin 58 can be moved from the retracted position to the extended position by applying hydraulic pressure.

With reference to FIG. 4, the camshaft system 100 may be part of an engine assembly 200. The engine assembly 200 may be part of a vehicle 202, such as a car. In the depicted embodiment, the engine assembly 200 includes an internal combustion engine 204 and an engine control module (ECM) 206 in communication, such as electronic communication, with the engine 204. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables.

The engine assembly 200 further includes an actuation assembly 208, such as a solenoid assembly. The actuation assembly 208 is in communication with the ECM 206 and, accordingly, can receive signals generated by the ECM 206. As a non-limiting example, the actuation assembly 208 may be in electronic communication with the ECM 206. As discussed in detail below, the actuator assembly 208 is operatively coupled to the control valve 106. In addition to the actuator assembly 208, the engine assembly 200 includes a fluid source 210, such as an oil source, fluidly coupled to the control valve 106. The fluid source 210 contains a fluid 120, such as oil, and can supply such fluid to the control valve 106 as discussed in detail below. A pump (or any other suitable pressure source or fluid displacement device) can be used to displace the fluid 120 from the fluid source 210 to the supply passageway 118.

The control valve 106 is also part of the engine assembly 200 and defines a supply passageway 118 in fluid communication with the fluid source 210. The supply passageway 118 extends through at least a portion of the shank 112 along the longitudinal axis 18. Accordingly, the fluid source 210 can supply the fluid 120 (e.g., oil) to the control valve 106 via the supply passageway 118.

Aside from the supply passageway 118, the control valve 106 defines a first body cavity 122 and a second body cavity 124. The first body cavity 122 is axially spaced from the second body cavity 124. Further, the first and second body cavities 122, 124 extend along the longitudinal axis 18 and are in fluid communication with each other and with the supply passageway 118.

The control valve 106 includes a first spool 126 movably disposed in the first body cavity 122 and a second spool 128 movably disposed in the second body cavity 122. Thus, the first and second spools 126, 128 are movably disposed in the valve body 108. The first and second spools 126, 128 may be substantially cylindrical and can move relative to the valve body 108 along the longitudinal axis 18. In particular, the first spool 126 can move within the first body cavity 122 along the longitudinal axis 18 between a first position (FIG. 5) and a second position (FIG. 6) as discussed in detail below. The second spool 128 can move within the second body cavity 122 along the longitudinal axis 18 between an Off or closed position (FIG. 7) and an On or open position (FIG. 8) as discussed in detail below. The first spool 126 can move independently of the movement of the second spool 128. In the depicted embodiment, the first spool 126 may be larger than the second spool 128.

Figure 5:
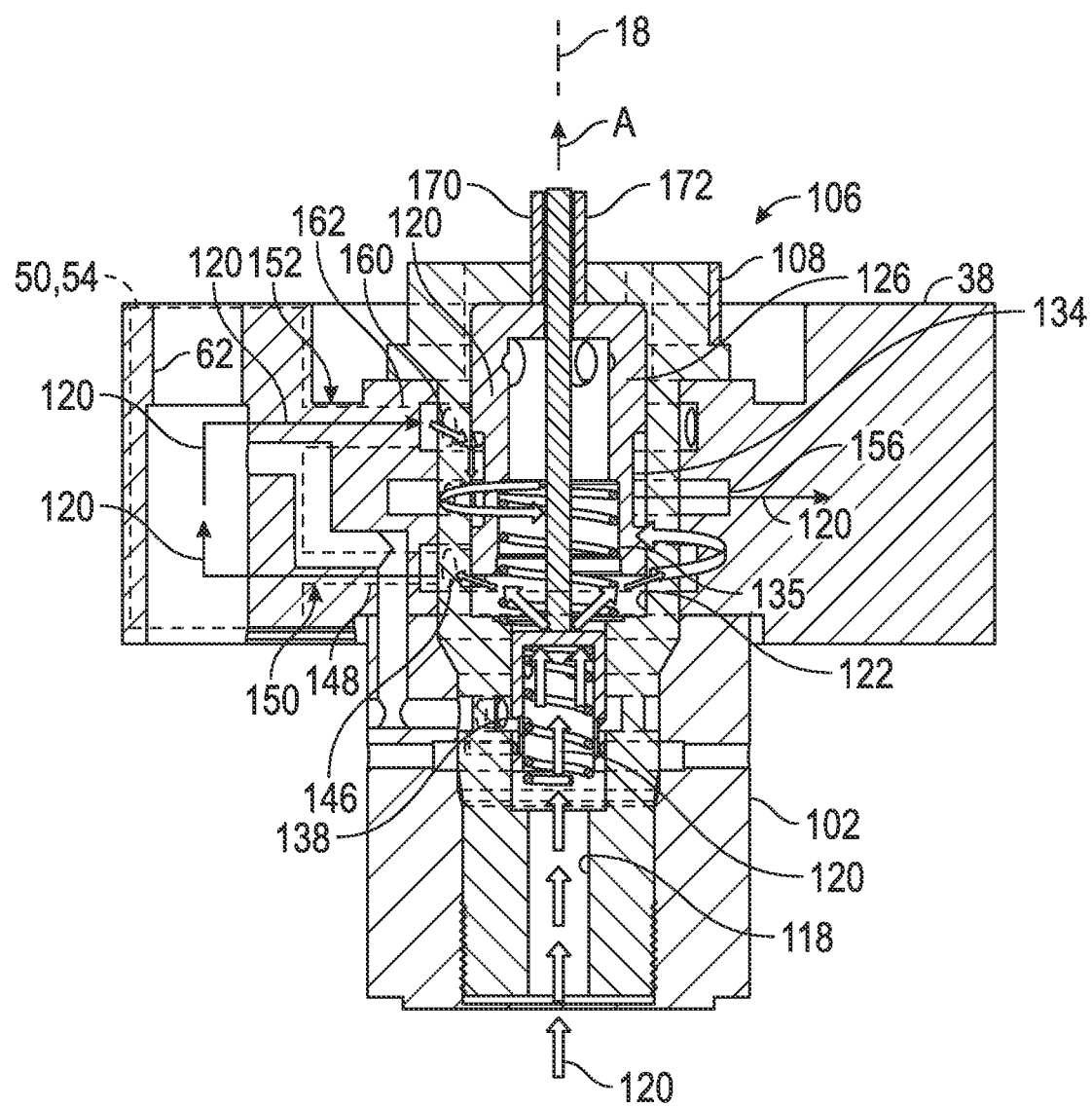
FIG. 5 is a schematic, sectional view of the camshaft system, depicting the first spool in a first position and the fluid flow when the first spool is in the first position.

The first spool 126 includes a first spool body 130 and defines a first spool cavity 132. The first spool cavity 132 is in fluid communication with the supply passageway 118 and can therefore receive fluid 120 (e.g., oil) from the fluid source 210. The first spool 126 further defines a first annular channel 134 disposed around the entire perimeter of the first spool body 130. In addition to the first annular channel 134, the first spool 126 defines at least one first spool passageway 142 extending through the first spool body 130. In the depicted embodiment, the first spool 126 defines more than one first spool passageways 142. Regardless of the quantity, the first spool passageways 142 are in fluid communication with the first spool cavity 132 and extend through the first spool body 130 in a radial direction, which may be substantially perpendicular to the longitudinal axis 18. The control valve 106 further includes a first spring 135, such as a coil spring, operatively coupled to the first spool 126 and the valve body 108. As such, the first spring 135 is partially disposed in the first spool cavity 132 and the first body cavity 122 and can bias the first spool 126 toward the first position (FIG. 5).

Figure 7:
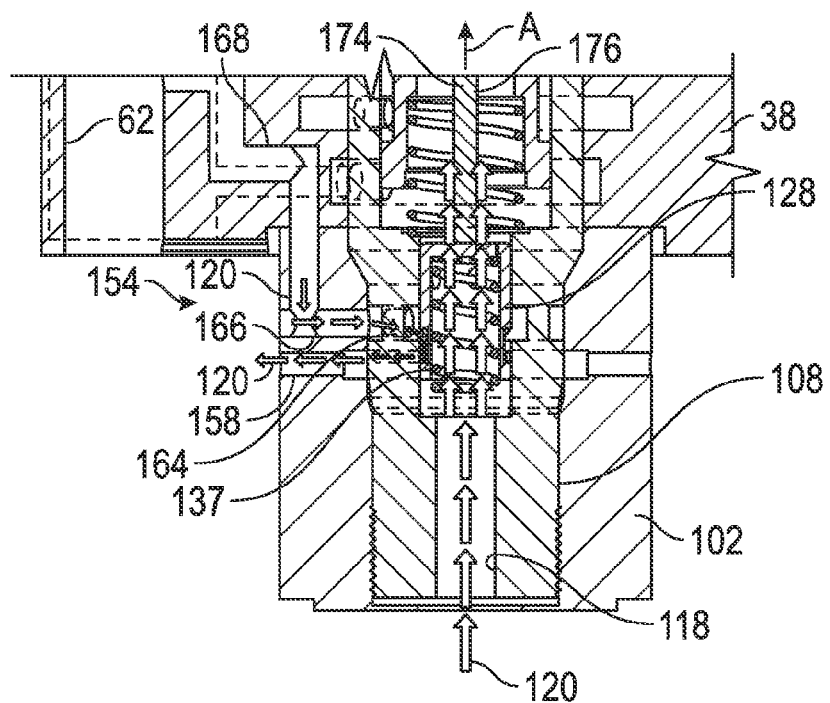
FIG. 7 is a schematic, sectional view of a portion of the camshaft system, depicting the second spool in a closed position.

The second spool 128 includes a second spool body 136 and defines a second spool cavity 138. The second spool cavity 138 is in fluid communication with the supply passageway 118 and can therefore receive fluid 120 (e.g., oil) from the fluid source 210. The second spool 128 further defines a second annular channel 140 disposed around the entire perimeter of the second spool body 136. In addition to the second annular channel 140, the second spool 128 defines at least one second spool passageway 144 extending through the second spool body 136. In the depicted embodiment, the second spool 128 includes more than one second spool passageway 144. Irrespective of the quantity, the second spool passageways 144 are in fluid communication with the second spool cavity 138 and extend through the second spool body 136 in the radial direction (i.e., a direction substantially perpendicular to the longitudinal axis 18). The control valve 106 further includes a second spring 137, such as a coil spring, operatively coupled to the second spool 128 and the valve body 108. As such, the second spring 137 is partially disposed in the second spool cavity 138 and can bias the second spool 128 toward the Off or closed position (FIG. 7).

The camshaft system 100 defines a first fluid passageway 150, a second fluid passageway 152, a third fluid passageway 154 (see also FIG. 3), a first vent 156, and a second vent 158. The first fluid passageway 150 extends through the rotor 38 and the valve body 108 and can fluidly couple the first chamber 54 (see also FIG. 3) to the first body cavity 122 or the first vent 156 depending on the position of the first spool 126 relative to the valve body 108. When the first spool 126 is in the first position (FIG. 5) relative to the valve body 108, the first fluid passageway 150 fluidly couples the supply passageway 118 with the first chamber 54 via the first body cavity 122, and the first spool 126 precludes fluid flow between the supply passageway 118 and the second fluid passageway 152. On the other hand, when the first spool 126 is in the second position relative to the valve body 108 (FIG. 6), the first fluid passageway 150 is in fluid communication with the first vent 156, and the first spool 126 precludes fluid flow between the first fluid passageway 150 and the supply passageway 118.

In the depicted embodiment, the first fluid passageway 150 extends through the rotor 38 and the valve body 108. As such, the first fluid passageway 150 includes a first valve passageway 146 and a first rotor passageway 148 in fluid communication with the first valve passageway 146. The valve body 108 defines the first valve passageway 146. The first valve passageway 146 can be disposed in fluid communication with the first body cavity 122 when the first spool 126 is in the first position (FIG. 5) and may have an annular shape. In other words, the supply passageway 118 is in fluid communication with the first valve passageway 146 when the first spool 126 is in the first position. Furthermore, the first valve passageway 146 extends through the valve body 108 and may surround the entire perimeter of the first body cavity 122. The first rotor passageway 148 extends through the rotor 38 and is always in fluid communication with the first chamber 54 (FIG. 3) and the first valve passageway 146.

The second fluid passageway 152 can fluidly couple the second chamber 50 with the first spool cavity 132 or the first vent 156 depending on the position of the first spool 126 relative to the valve body 108. When the first spool 126 is in the first position relative to the valve body 108 (FIG. 5), the second fluid passageway 152 is in fluid communication with the first vent 156, and the first spool 126 precludes fluid flow between the second fluid passageway 152 and the supply passageway 118. In other words, when the first spool 126 is in the first position relative to the valve body 108 (FIG. 5), the first spool 126 precludes fluid flow between the second fluid passageway 152 and the first spool cavity 132. On the other hand, when the first spool 126 is in the second position relative to the valve body 108 (FIG. 6), the second fluid passageway 152 fluidly couples the second chamber 50 and the first body cavity 122, and the first spool 126 precludes fluid flow between the first fluid passageway 150 and the first spool cavity 132. In other words, when the first spool 126 is in the second position relative to the valve body 108 (FIG. 6), the second fluid passageway 152 fluidly couples the second chamber 50 and the supply passageway 118, and the first spool 126 precludes fluid flow between the first fluid passageway 150 and the supply passageway 118.

In the depicted embodiment, the second fluid passageway 152 extends through the rotor 38 and the valve body 108. As such, the second fluid passageway 152 includes a second valve passageway 160 and a second rotor passageway 162 in fluid communication with the second valve passageway 160. Further, the second valve passageway 160 can be disposed in fluid communication with the first spool cavity 132 when the first spool 126 is in the second position (FIG. 6) and may have an annular shape. Further, the second valve passageway 160 extends through the valve body 108 and may surround the entire perimeter of the first body cavity 122. The second rotor passageway 162 extends through the rotor 38 and is always in fluid communication with the second chamber 50 (FIG. 3) and the second valve passageway 160.

The first vent 156 extends through the valve body 108 and may surround the entire perimeter of the first spool cavity 132. Moreover, the first vent 156 is always in fluid communication with the first annular channel 134. However, the first vent 156 is in fluid communication with the first fluid passageway 150 (i.e., the first valve passageway 146 and first rotor passageway 148) only when the first spool 126 is in the first position (FIG. 5) relative to the valve body 108. Also, the first vent 156 is in fluid communication with the second fluid passageway 152 (i.e., second valve passageway 160 and second rotor passageway 162) only when the first spool 126 is in the second position (FIG. 6) relative to the valve body 108.

The third fluid passageway 154 can fluidly couple the hole 62 with the second vent 158 or the second spool cavity 138 depending on the position of the second spool 128 relative to the valve body 108. When the second spool 128 is in the Off or closed position (FIG. 7) relative to the valve body 108, the third fluid passageway 154 fluidly couples the hole 62 with the second vent 158, and the second spool 128 precludes fluid flow between the second spool cavity 138 and the third fluid passageway 154. In other words, when the second spool 128 is in the Off or closed position (FIG. 7) relative to the valve body 108, the second spool 128 precludes fluid flow between the supply passageway 118 and the third fluid passageway 154. On the other hand, when the second spool 128 is in the On or open position (FIG. 8), the third fluid passageway 154 fluidly couples the second spool cavity 138 and the hole 62, and the second spool 128 precludes fluid flow between the second spool cavity 138 and the second vent 158. In other words, when the second spool 128 is in the On or open position (FIG. 8), the third fluid passageway 154 fluidly couples the supply passageway 118 and the hole 62, and the second spool 128 precludes fluid flow between the supply passageway 118 and the second vent 158.

Figure 8:
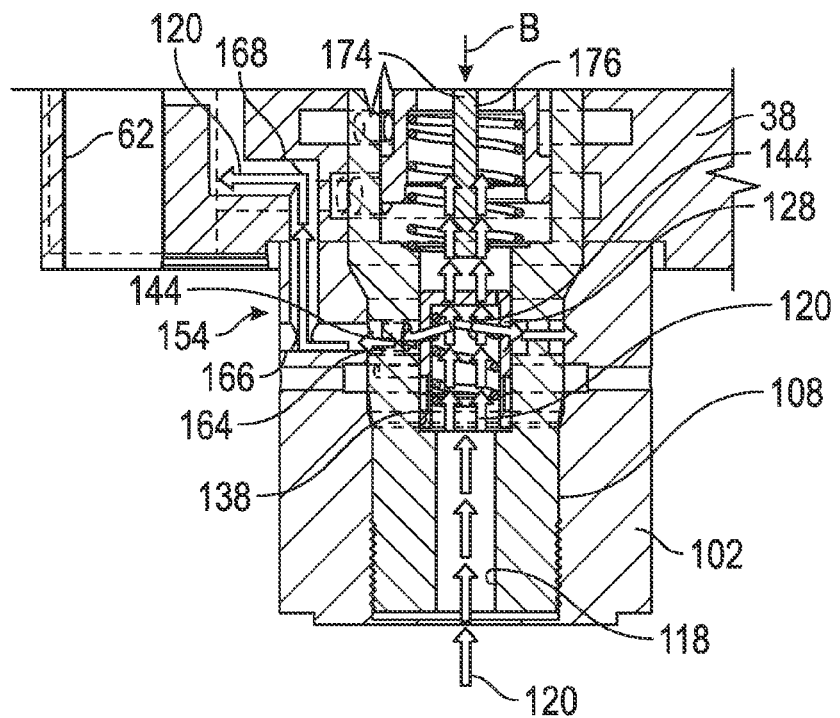
FIG. 8 is a schematic, sectional view of a portion of the camshaft system, depicting the second spool in an open position.

In the depicted embodiment, the third fluid passageway 154 extends through the rotor 38, the camshaft 102, and the valve body 108. As such, the third fluid passageway 154 includes a third valve passageway 164, a camshaft passageway 166, and a third rotor passageway 168. The third valve passageway 164, camshaft passageway 166, and third rotor passageway 168 are in fluid communication with one another. In particular, the third valve passageway 164 may have an annular shape and is in fluid communication with the second spool cavity 138 when the second spool 128 is in the On or open position (FIG. 8). Further, the third valve passageway 164 extends through the valve body 108 and may surround the entire perimeter of the second spool cavity 138. The camshaft passageway 166 extends through the camshaft 102 and is always in fluid communication with the third valve passageway 164 and the third rotor passageway 168. The third rotor passageway 168 extends through the rotor 38 and is always in fluid communication with the camshaft passageway 166 and the hole 62.

Figure 6:
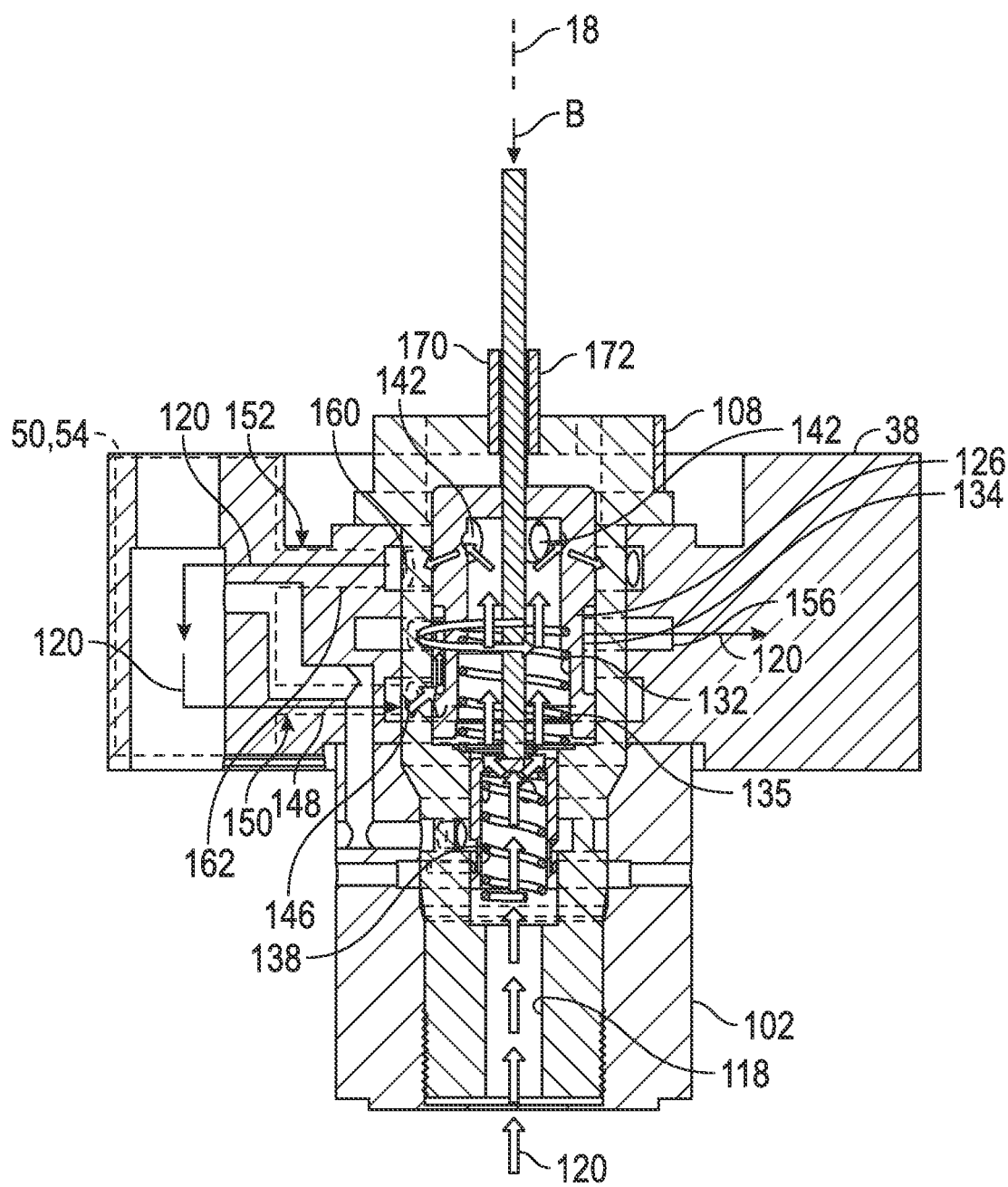
FIG. 6 is a schematic, sectional view of the camshaft system, depicting the first spool in a second position and the fluid flow when the first spool is in the second position.

The flow of the fluid 120 through the passageways (e.g., third valve passageway 164) of the camshaft system 100 depends, at least in part, on the movement and position of the first and second spools 126, 128 in relation to the valve body 108. To move the first spool 126 relative to the valve body 108, the camshaft system 100 includes a first driving member 170 operatively coupled to the first spool 126. In the depicted embodiment, the first driving member 170 is a sleeve 172 operatively connected to the first spool 126. In this embodiment, movement of the sleeve 172 along the longitudinal axis 18 causes the first spool 126 to move relative to the valve body 108 between the first position (FIG. 5) and the second position (FIG. 6).

The camshaft system 100 further includes a second driving member 174 operatively coupled to the second spool 128. The second driving member 174 can move along the longitudinal axis 18 in order to move the second spool 128 between the Off or closed position (FIG. 7) and the On or open position (FIG. 8). In the depicted embodiment, the second driving member 174 is a rod 176 operatively coupled to the second spool 128. The sleeve 172 may surround at least a portion of the rod 176. The rod 176 may extend through the sleeve 172 and the first spool 126. In operation, moving the rod 176 along the longitudinal axis 18 causes the second spool 128 to move relative to the valve body 108 between the Off or closed position (FIG. 7) and the On or open position.

The actuation assembly 208 may be operatively coupled to the first and second driving members 170, 174. As such, upon actuation of the actuation assembly 208, the first driving member 170, the second driving member 174, or both move relative to the valve body 108 along the longitudinal axis 18. As a non-limiting example, the actuation assembly 208 can modulate the movement of the first spool 126 upon receipt of a modulation signal from the ECM 206. To do so, the actuation assembly 208 may include a pulse-width modulation (PWM) module 212, such as a PWM controller, operatively coupled to the first driving member 170 (e.g., sleeve 172). During operation, the PWM module 210 can modulate the movement of the first spool 126 (via the first driving member 170), e.g., via rapid semiconductor switching to generate a required voltage output in order to continuously adjust the position of the first spool 126 based at least in part on signals or instructions (e.g., modulation signal) generated by the ECM 206. In other words, the actuation assembly 208 can modulate the movement of the first spool 126 upon receipt of a modulation signal from the ECM 206. The position of the first spool 126 relative to the valve body 108 can be adjusted to retard or advance to the rotor 38 relative to the stator 22. Therefore, the position of the first spool 126 is not limited to the first and second positions. Rather, the first spool 126 is continuously moving and could be anywhere in between first and second position as commanded by the ECM 206.

The actuation assembly 208 may further include an On/Off module 214, such as an On/Off controller or circuit, operatively coupled to the second driving member 174 (e.g., rod 176). As such, the On/Off module 214 can move the second driving member 174 (e.g., rod 176) in order to move the second spool 128 relative to the valve body 108. As a non-limiting example, the On/Off module 214 can move the second spool 128 (via the second driving member 174) from the Off or closed position (FIG. 7) to the On or open position (FIG. 8) upon receipt of an On signal from the ECM 206. In other words, the actuation assembly 208 can move the second spool 128 (via the second driving member 174) from the Off or closed position (FIG. 7) to the On or open position (FIG. 8) upon receipt of an On signal from the ECM 206. Conversely, the On/Off module 214 can move the second spool 128 from the On or open position (FIG. 8) to the Off or closed position (FIG. 7) upon receipt of an Off signal from the ECM 206. In other words, the actuation assembly 208 can move the second spool 128 from the On or open position (FIG. 8) to the Off or closed position (FIG. 7) upon receipt of an Off signal from the ECM 206. Moving the second spool 128 to the On or open position causes the lock pin 58 to move to its retracted position, thereby allowing the rotor 38 to turn about the longitudinal axis 18 relative to the stator 22. On the other hand, moving the second spool 128 to the Off or closed position causes the lock pin 58 to move to its extended position, thereby locking the rotor 38 to the stator 22. Although the drawings show that the actuation assembly 208 includes the PWM module 212 and the On/Off module 214, the PWM module 212 and the On/Off module 214 may be separate components. It is also contemplated that the PWM module 212 and the On/Off module 214 may be other suitable actuators, such as entirely mechanical actuators. Accordingly, the PWM module 212 may be alternatively referred to as a first actuation module, and the On/Off module 214 may be referred to as a second actuation module. Regardless of the kind of actuators employed (e.g., PWM module 212 and On/Off module 214), the first spool 126 and the second spool 128 can move independently of each other.

With reference to FIG. 5, the spring 135 biases the first spool 126 in the direction indicated by arrow A. Accordingly, the first spool 126 is biased toward the first position. When the first spool 126 is in the first position relative to the valve body 108, the fluid 120 (e.g., oil) initially enters the supply passageway 118 and travels toward the second spool cavity 138. Then, the fluid 120 continues to the first body cavity 122 and eventually flows into the first fluid passageway 150 (FIG. 4). Specifically, the fluid 120 flows from the first body cavity 122 to the first valve passageway 146. As discussed above, when the first spool 126 is in the first position relative to the valve body 108, the first body cavity 122 is in fluid communication with the first valve passageway 146. Once in the first valve passageway 146, the fluid 120 flows to the first rotor passageway 148. Next, the fluid 120 flows from the first fluid passageway 150 (specifically the first rotor passageway 148) into the first chamber 54 (FIG. 3). Supplying fluid 120 into the first chamber 54 urges the rotor 38 to rotate relative to the stator 22 in a first rotational direction R1 (FIG. 3). In summary, the supply passageway 118 is in fluid communication with the first chamber 54 when the first spool 126 is in the first position.

With continued reference to FIG. 5, when the first spool 126 is in the first position relative to the valve body 108, the fluid 120 in the second chamber 50 (FIG. 3) flows into the second fluid passageway 152. Specifically, the fluid 120 in the second chamber 50 (FIG. 3) flows into the second rotor passageway 162. Then, the fluid 120 flows from the second rotor passageway 162 into the second valve passageway 160. Next, the fluid 120 flows from the second valve passageway 160 to the first vent 156 via the first annular channel 134. As discussed above, the second valve passageway 160 is fluidly coupled to the first vent 156 via the first annular channel 134 when the first spool 126 is in the first position relative to the valve body 108. Then, the fluid 120 can flow out of the camshaft system 100 via the first vent 156. In summary, the second chamber 50 is in fluid communication with the first vent 156 when the first spool 126 is in the first position.

With reference to FIG. 6, the first driving member 170 (e.g., sleeve 172) can be moved in the direction indicated by arrow B against the influence of the first spring 135 in order to move the first spool 126 toward the second position. As discussed above, the actuation assembly 208 can continuously adjust the position of the first spool 126. When the first spool 126 is in the second position, the fluid 120 enters the camshaft system 100 via the supply passageway 118. Then, the fluid 120 flows from the supply passageway 118 into the second spool cavity 138. Next, the fluid 120 flows from the second spool cavity 138 to the first spool cavity 132. The fluid 120 then flows from the first spool cavity 132 to the second fluid passageway 152 via the first spool passageways 142. Specifically, the fluid 120 flows from the first spool cavity 132 to the second valve passageway 160. As discussed above, when the first spool 126 is in the second position, the first spool cavity 132 is in fluid communication with the second fluid passageway 152 via the first spool passageways 142. In particular, when the first spool 126 is in the second position, the first spool cavity 132 is in fluid communication with the second valve passageway 160 via the first spool passageways 142. The fluid 120 then flows from the second valve passageway 160 to the second rotor passageway 162. Next, the fluid 120 flows from the second fluid passageway 152 into the second chamber 50 (see also FIG. 3). Specifically, the fluid 120 flows from the second rotor passageway 162 to the second chamber 50. Supplying fluid 120 into the second chamber 50 urges the rotor 38 to rotate relative to the stator 22 in a second rotational direction R2 (FIG. 3). The second rotational direction R2 is opposite to the first rotational direction R1. In summary, the supply passageway 118 is in fluid communication with the second chamber 50 when the first spool 126 is in the second position.

With continued reference to FIG. 6, when the first spool 126 is in the second position relative to the valve body 108, the fluid 120 in the first chamber 54 (FIG. 3) flows into the first fluid passageway 150. Specifically, the fluid 120 in the first chamber 54 flows into the first rotor passageway 148. Then, the fluid 120 flows from the first rotor passageway 148 to the first valve passageway 146. Next, the fluid 120 flows from the second valve passageway 146 to the first vent 156 via the first annular channel 134. As discussed above, the first valve passageway 146 is fluidly coupled to the first vent 156 via the first annular channel 134 when the first spool 126 is in the second position relative to the valve body 108. Then, the fluid 120 can flow out of the camshaft system 100 via the first vent 156. In summary, the first vent 156 is in fluid communication with the first chamber 54 when the first spool 126 is in the second position.

With reference to FIG. 7, the second spring 137 biases the second spool 128 in the direction indicated by arrow A. Accordingly, the second spool 128 is biased toward the Off or closed position. When the second spool 128 is in the Off or closed position, the third fluid passageway 154 is not in fluid communication with the supply passageway 118. However, the third fluid passage 154 is in fluid communication with the second vent 158 when the second spool 128 is in the Off or closed position relative to the valve body 108. As a consequence, when the second spool 128 is in the Off or closed position relative to the valve body 108, the fluid 120 (e.g., oil) flows from the hole 62 to the third fluid passageway 154, thereby allowing the lock pin 58 (FIG. 3) to move to an extended position (i.e., an locked position). A spring (not shown) may bias the lock pin 58 to the extended position. As discussed above, when the lock pin 58 is in the extended position, the rotor 38 remains stationary relative to the stator 22. Specifically, when second spool 128 is in the Off or closed position relative to the valve body 108, the fluid 120 (e.g., oil) flows from the hole 62 to the third rotor passageway 168. Then, the fluid 120 flows from the third rotor passageway 168 to the camshaft passageway 166. Next, the fluid 120 flows the camshaft passageway 166 to the third valve passageway 164.

The fluid 120 flows from the third valve passageway 164 to the second vent 158 via the second annular channel 140. Then, the fluid 120 can flow out of the camshaft system 100 via the second vent 158. In summary, the second vent 158 is in fluid communication with the hole 62 when the second spool 128 is in the closed position. Further, the second spool 128 precludes fluid flow between the supply passageway 118 and the hole 62 when the second spool 128 is in the closed position.

With reference to FIG. 8, the second driving member 174 (e.g., rod 176) can be moved in the direction indicated by arrow B against the influence of the second spring 137 in order to move the second spool 128 from the Off or closed position to the On or open position. When the second spool 128 is in the On or open position, the supply passageway 118 is in fluid communication with the hole 62. To reach the hole 62, the fluid 120 first flows from the supply passageway 118 to the second spool cavity 138. Then, the fluid 120 flows from the second spool cavity 138 to the third fluid passageway 154 via the second spool passageways 144. In particular, the fluid 120 flows from the second spool cavity 138 to the camshaft passageway 166 via the second spool passageways 144. Next, the fluid 120 flows from the camshaft passageway 166 to the third rotor passageway 168. The fluid 120 then flows from the third rotor passageway 168 to the hole 62, thereby urging the lock pin 58 (FIG. 3) to move from the extended position (i.e., locked position) to the retracted position (i.e., unlocked position). As discussed above, when the lock pin 58 (FIG. 3) is in the retracted position, the rotor 38 is free to rotate relative to the stator 22. In summary, the supply passageway 118 is in fluid communication with the hole 62 when the second spool 128 is in the open position. Further, the second spool 128 precludes fluid flow between the second vent 158 and the supply passageway 118 when the second spool 128 is in the open position. The fluid 128 always flows from the supply passageway 118 to the first spool cavity 132 regardless of the position of the second spool 128. In other words, the second spool 128 can be either open or closed, and there will always be fluid 120 that will reach the first spool cavity 132.

While the best modes for carrying out the invention have been described in detail, those familiar with the art to which this invention relates will recognize various alternative designs and embodiments for practicing the invention within the scope of the appended claims.

The invention claimed is:

1. A control valve, comprising:
 a valve body extending along a longitudinal axis, wherein the valve body defines a first valve passageway, a second valve passageway, a third valve passageway, and a supply passageway;
 a first spool movably disposed in the valve body, wherein the first spool is movable relative to the valve body along the longitudinal axis between a first position and a second position; and
 a second spool movably disposed in the valve body, wherein the second spool is movable relative to the valve body along the longitudinal axis between an open position and a closed position;
 wherein the supply passageway is in fluid communication with the first valve passageway when the first spool is in the first position, with the second valve passageway when the first spool is in the second position, and with the third valve passageway when the second spool is in the open position; and
 wherein the second spool precludes fluid flow between the supply passageway and the third valve passageway when the second spool is in the closed position.

2. The control valve of claim 1, wherein the first spool is movable relative to the valve body independently of the second spool.

3. The control valve of claim 1, wherein the first spool precludes fluid flow between the supply passageway and the first valve passageway when the first spool is in the second position.

4. The control valve of claim 1, wherein the first spool blocks fluid flow between the supply passageway and the second valve passageway when the first spool is in the first position.

5. The control valve of claim 1, further comprising a spring operatively coupled to the first spool such that the first spool is biased toward the first position.

6. The control valve of claim 5, wherein the spring is a first spring, and the control valve further includes a second spring operatively coupled to the second spool such that the second spool is biased toward the closed position.

7. The control valve of claim 1, further comprising a rod operatively coupled to the second spool such that movement of the rod along the longitudinal axis causes the second spool to move relative to the valve body between the open and closed positions.

8. The control valve of claim 7, further comprising a sleeve disposed around the rod, wherein the sleeve is operatively coupled to the first spool such that movement of the sleeve along the longitudinal axis causes the first spool to move relative to the valve body between the first and second positions.

9. The control valve of claim 1, wherein the valve body defines a vent, and the vent is in fluid communication with the second valve passageway when the first spool is in the first position.

10. The control valve of claim 9, wherein the vent is in fluid communication with the first valve passageway when the first spool is in the second position.

11. The control valve of claim 10, wherein the vent is a first vent, the valve body defines a second vent, and the second vent is in fluid communication with the third valve passageway when the second spool is in the closed position.

12. A camshaft system, comprising:
 a camshaft extending along a longitudinal axis;
 a variable cam phaser operatively coupled to the camshaft, wherein the variable cam phaser includes:
  a stator including at least one lobe;
  a rotor operatively coupled to the camshaft, wherein the rotor is disposed in the stator and includes first and second vanes, the at least one lobe is disposed between the first and second vanes such that the rotor and the stator collectively define a first chamber between the at least one lobe and the first vane, and a second chamber is defined between the at least one lobe and the second vane, the rotor defining a hole in the first vane;
 a lock pin movably disposed in the hole; and
 a control valve operatively coupled to the variable cam phaser, wherein the control valve includes:
  a valve body operatively coupling the camshaft to the rotor, wherein the valve body defines a supply passageway;
  a first spool movably disposed in the valve body, wherein the first spool is movable relative to the valve body between a first position and a second position;
  a second spool movably disposed in the valve body, wherein the second spool is movable relative to the valve body between an open position and a closed position;

wherein the supply passageway is in fluid communication with the first chamber when the first spool is in the first position, with the second chamber when the first spool is in the second position, and with the hole when the second spool is in the open position; and wherein the second spool precludes fluid flow between the supply passageway and the hole when the second spool is in the closed position.

13. The camshaft system of claim 12, wherein the first spool is movable relative to the valve body independently of the second spool.

14. The camshaft system of claim 12, wherein the first spool precludes fluid flow between the supply passageway and the first chamber when the first spool is in the second position.

15. The camshaft system of claim 12, wherein the first spool precludes fluid flow between the supply passageway and the second chamber when the first spool is in the first position.

16. The camshaft system of claim 12, further comprising a rod operatively coupled to the second spool such that movement of the rod along the longitudinal axis causes the second spool to move relative to the valve body between the open and closed positions.

17. The camshaft system of claim 16, further comprising a sleeve disposed around the rod, wherein the sleeve is operatively coupled to the first spool such that movement of the sleeve along the longitudinal axis causes the first spool to move relative to the valve body between the first and second positions.

18. The camshaft system of claim 17, further comprising an actuation assembly operatively coupled to the rod and the sleeve such that the rod and the sleeve move relative to the valve body upon actuation of the actuation assembly.

19. The camshaft assembly of claim 18, wherein the actuation assembly includes an On/Off module operatively coupled to the rod such that actuation of the on/off module causes the rod to move the second spool from the closed position to the open position.

20. The camshaft assembly of claim 18, wherein the actuation assembly includes a pulse width modulation module operatively coupled to the sleeve such that actuation of the pulse width modulation module causes the sleeve to move the first spool between the first position and the second position.

* * * * *